US008027077B2

(12) United States Patent
Border

(10) Patent No.: US 8,027,077 B2
(45) Date of Patent: Sep. 27, 2011

(54) LOW COST MOVEABLE MIRROR

(75) Inventor: John N. Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 179 days.

(21) Appl. No.: 12/236,942

(22) Filed: Sep. 24, 2008

(65) Prior Publication Data

US 2010/0073789 A1    Mar. 25, 2010

(51) Int. Cl.
*G02B 26/08* (2006.01)
(52) U.S. Cl. .................................... 359/224.1
(58) Field of Classification Search ..... 359/223.1–226.1
See application file for complete search history.

(56) References Cited

U.S. PATENT DOCUMENTS

| 6,947,188 B2 * | 9/2005 | Miles et al. ............... 359/224.1 |
| 2004/0240032 A1 * | 12/2004 | Miles ............................ 359/291 |
| 2008/0165402 A1 | 7/2008 | Nakamura et al. |

FOREIGN PATENT DOCUMENTS

WO    WO 2006/110908    10/2006

OTHER PUBLICATIONS

"Micromachined Unimorphs and Bimorphs" by Roger Farlow, et al., 2001 IEEE Ultrasonics Symposium, pp. 913-916.

* cited by examiner

*Primary Examiner* — Euncha Cherry
(74) *Attorney, Agent, or Firm* — Peyton C. Watkins

(57) ABSTRACT

It is an object of the present invention to provide a low cost moveable mirror with 2 axes of movement that is suitable for use in an optical application where a relatively large tip of tilt of a mirror is needed in a known series of positions repeatably and rapidly. This object is achieved by providing a planar structure with 4 bending actuators that can be produced through MEMs based manufacturing. The moveable mirror is flexibly connected to the bending actuators so it can be moved on 2 axes. The bending actuators are designed to have substantial length to increase the angular movement of the mirror. Hard stops are provided to provide repeatable and accurate positioning of the mirror for selected positions.

14 Claims, 15 Drawing Sheets

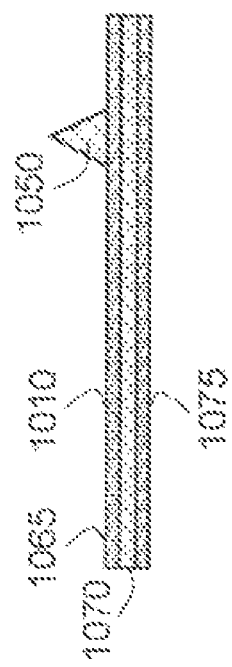
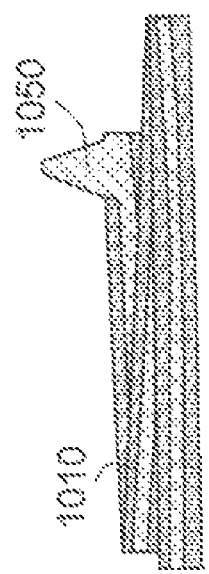

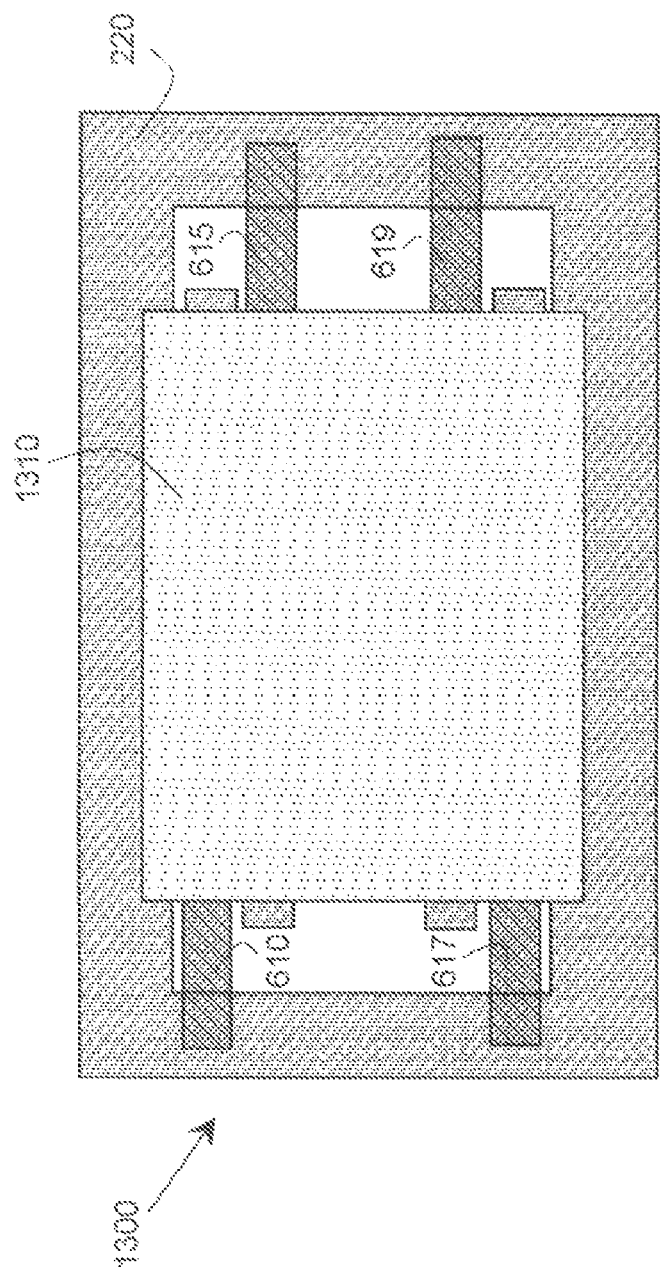
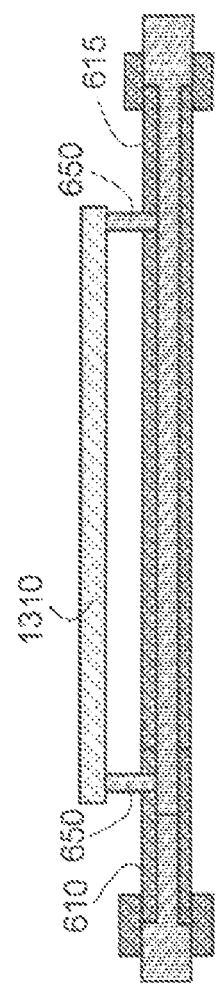
FIG. 13a
FIG. 13b

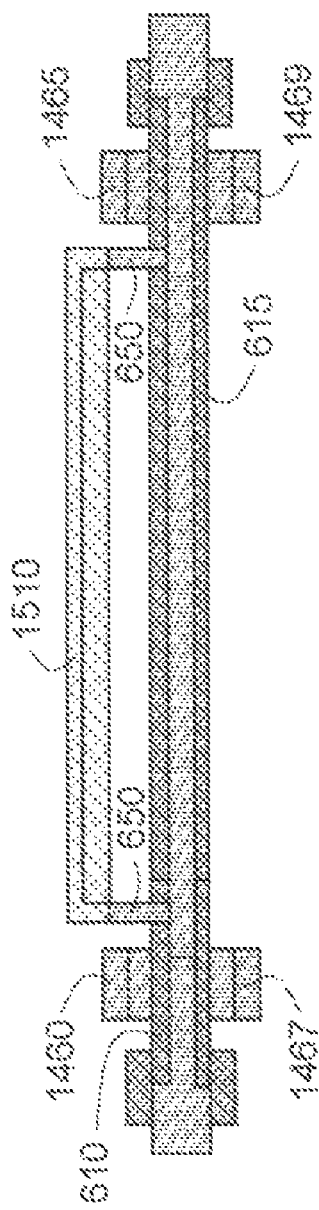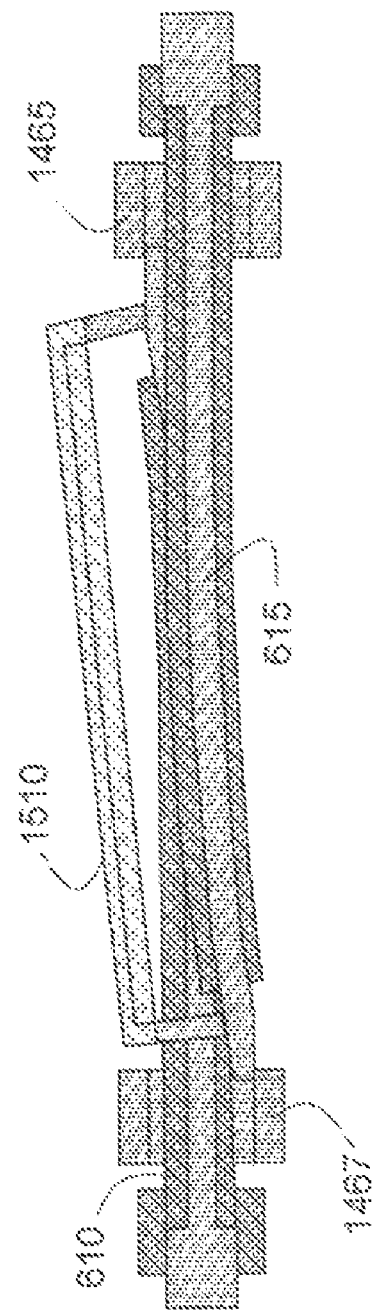

LOW COST MOVEABLE MIRROR

CROSS REFERENCE TO RELATED APPLICATIONS

Reference is made to commonly assigned U.S. patent application Ser. No. 12/175,142 filed Jul. 17, 2008 by John N. Border et al., entitled "Zoom by Multiple Image Capture", the disclosure of which are herein incorporated by reference.

FIELD OF THE INVENTION

The present invention generally relates to a MEMS device having a movable mirror. More particularly, the present invention pertains to including the MEMs device with the moveable mirror in imaging systems.

BACKGROUND OF THE INVENTION

In related U.S. patent application Ser. No. 12/175,142, a compact zoom imaging system is described that utilizes a moveable mirror to select different fields of view for a series of images that are stitched together to form a wide angle image in a zoom system. Moveable mirror devices for imaging systems require fast actuators that can move mirrors of relatively large size, have 2 axes of movement, have low power requirements, can produce large deflections and low cost in a compact form factor. In addition, for a moveable mirror device for the zoom system as disclosed, the mirror only needs to operate to a series of known positions. However, the positioning of the mirror at these known positions must be done reliably with high accuracy.

Moveable mirror systems can be formed with a variety of actuators to tip and tilt the mirror. Thermal actuators, magnetic actuators, electrostatic actuators and piezoelectric actuators have been used to make different types of moveable mirrors for beam steering applications.

U.S. patent application Ser. No. 2008/0165402 discloses a moveable plate that can be used with a mirror in an optical scanner. However, the moveable plate as disclosed has relatively short piezoelectric actuators that are constrained in the way they work against each other so that the performance is limited to smaller deflections. In addition, the piezoelectric actuators are designed to operate over a continuous range of positions so that the repeatability and accuracy of positioning the moveable plate is limited and complex control circuitry with positional feedback is required to improve the repeatability and accuracy. Further, the actuators are located outside the mirror so that the movable plate assembly is substantially bigger then the movable plate.

World International Patent Organization Patent Application 2006/110908 describes a displaceable platform that can be tipped and tilted by 4 piezoelectric actuators. However, the piezoelectric actuators are curved so that the MEMs device is difficult and expensive to make. In addition, the curved nature of the piezoelectric actuators increases the overall size of the device.

Therefore, a need exists for a low cost moveable mirror that is small in size and can rapidly and repeatably move to a series of known positions with accuracy.

SUMMARY OF THE INVENTION

The present invention is directed to overcoming one or more of the problems set forth above. Briefly summarized, according to one aspect of the invention, the invention resides in an apparatus including four bending actuators each placed substantially parallel to each other, and a mirror flexibly connected to the four bending actuators so that the mirror is repositioned by the four bending actuators, wherein the four actuators span at least a portion of the mirror.

It is an object of the present invention to provide a low cost moveable mirror with 2 axes of movement that is suitable for use in a zoom system where images in adjacent fields of view are stitched together to form a wide angle image. The present invention is also suitable for other applications where a relatively large tip or tilt of a mirror is needed to a known series of positions repeatably and rapidly.

This object is achieved by providing a planar structure with 4 bending actuators that can be produced through (microelectromechanical systems) MEMs based manufacturing. The moveable mirror is flexibly connected to the bending actuators so it can be moved on 2 axes. The bending actuators are designed to extend and span under the mirror to provide a greater length to increase the angular movement of the mirror while not increasing the overall size of the moveable mirror assembly. Hard stops are provided to provide repeatable and accurate positioning of the mirror for selected positions.

These and other objects, features, and advantages of the present invention will become apparent to those skilled in the art upon a reading of the following detailed description when taken in conjunction with the drawings wherein there is shown and described an illustrative embodiment of the invention.

ADVANTAGEOUS EFFECT OF THE INVENTION

The present invention has the advantage of providing a moveable mirror with substantially large angular movement. The moveable mirror assembly is comprised of substantially planar structures so that MEMs fabrication techniques can be used during manufacturing to reduce costs. The bending actuators extend under and at least partially spanning the mirror to provide additional bending length for increased movement of the mirror while allowing for a reduced overall size of the moveable mirror assembly. The hard stops enable simple control of the mirror without the need for positional feedback to fiber reduce cost while also providing repeatable and accurate positioning with reduced vibration.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

While the specification concludes with claims particularly pointing out and distinctly claiming the subject matter of the present invention, it is believed that the invention will be better understood from the following description when taken in conjunction with the accompanying drawings, wherein:

FIGS. 12a and 12b are schematic diagrams of a cross section of one of the actuators in the embodiment of the present invention shown in FIGS. 10 and 11 where the actuator is shown without voltage and with voltage applied to the electrical pads respectively;

FIGS. 13a and 13b are schematic diagrams of yet another embodiment of the present invention showing the mirror as flexibly connected to the 4 actuators wherein the actuators are of the type shown in FIGS. 6-9;

FIGS. 15a and 15b are schematic diagrams of cross sectional views of the movable mirror assembly from FIG. 14 for the conditions without voltage and with voltage applied to the electrical pads which shows the operation of the hard stops.

DETAILED DESCRIPTION OF THE INVENTION

The present invention provides a compact moveable mirror assembly wherein bending actuators are used to move a mirror along 2 orthogonal axes to provide movable tip and tilt motions of a mirror. The moveable mirror assembly is comprised of substantially planar structures so that the device can be manufactured using known MEMs fabrication techniques to reduce costs.

Figure 1:
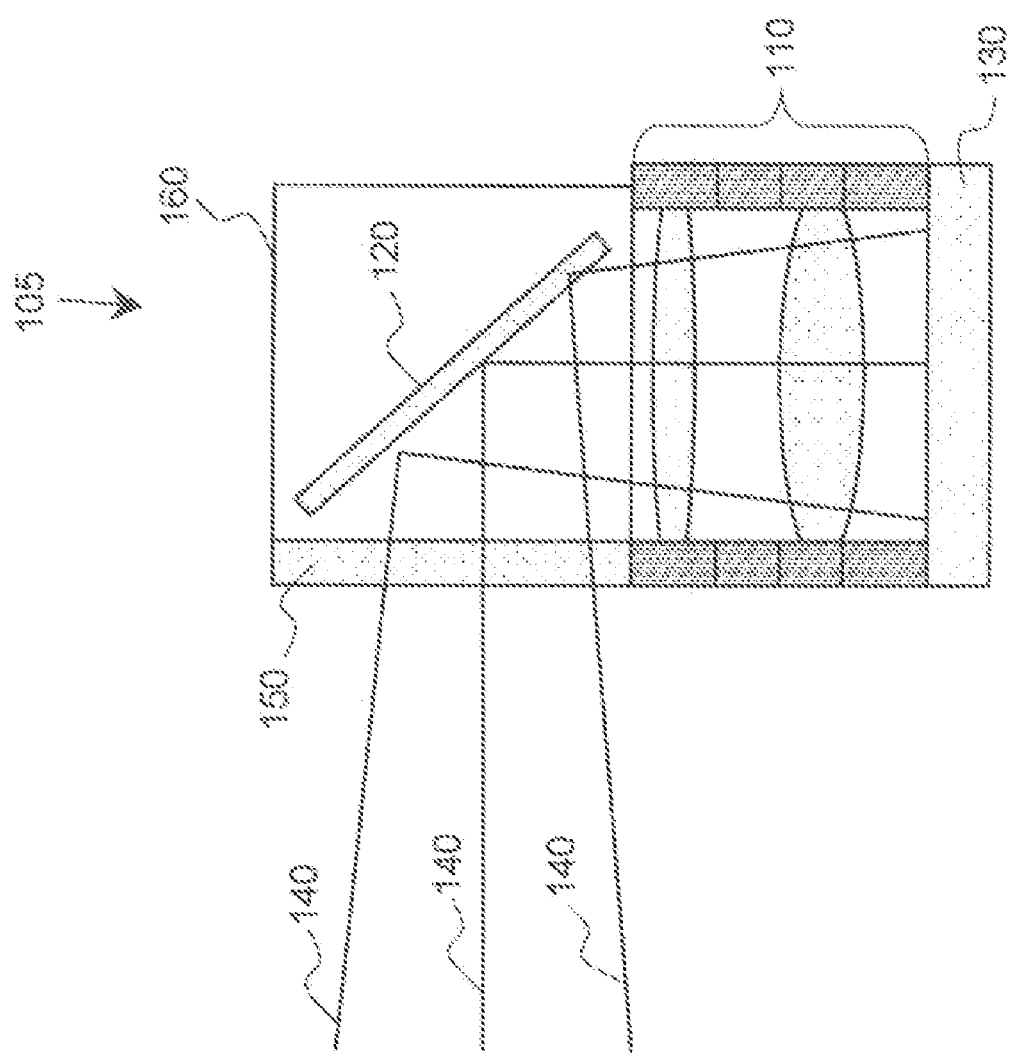
FIG. 1 is a schematic diagram of a cross sectional view of an image module which contains a moveable mirror of the present invention.

FIG. 1 shows a schematic diagram of an image module 105 for an image capture device, such as a digital camera, composed of an image sensor 130, a lens assembly 110 wherein the lens assembly has a fixed focal length with a relatively narrow field of view (substantially telephoto), a moveable mirror 120, a cover glass 150 and an enclosure 160. The moveable mirror 120 redirects the incoming light rays 140 from a field of view so that the light passes through the lens assembly 110 and falls onto the image sensor 130. By tilting or tipping the moveable mirror 120, light rays 140 from different fields of view can be directed through the lens assembly 110 and onto the image sensor 130, thereby enabling an image to be captured of a different portion of the scene. Thus the moveable mirror 120 enables a series of images of adjacent fields of view to be captured without having to move or redirect the image module or the image capture device. The series of images can then be stitched together to form a new image with a wider field of view. The moveable mirror 120 is the subject of the present invention. The moveable mirror 120 can be used in an imaging system such as shown in FIG. 1 and also in other optical systems which benefit from a low cost moveable mirror which can be rapidly and repeatably moved between a known series of positions that cover a relatively large angular range.

A variety of actuators can be used with the invention. Thermal actuators operate by heating and cooling portions of the actuator differentially to bend the actuator. However, thermal actuators can require high levels of power for fast motion. Power is also required to maintain a position. In addition, thermal actuators tend to be slow during the phase of actuation that is driven by cooling.

Magnetic actuators act by an electric current in a coil attracting a magnetic surface. However, since an electrical current is involved, power is required to maintain a position. Fast motion of the actuator requires high levels of current or large coils. To actively drive the actuator in two directions, two coils are required for rapid response.

Electrostatic actuators operate by applying a voltage to adjacent areas. Due to the rapid falloff of the electric fields produced by the voltage applied to the adjacent areas, electrostatic actuators are typically limited to microns of motion. Electrostatic actuators are low power in nature since the electric fields are produced by a capacitive influx of electricity. Power is not required to maintain a position.

Piezoelectric actuators include multiple layers of piezoelectric materials which expand and contract when voltage is applied separated by electrodes. Piezoelectric bending actuators can be driven to deflect up and down when two or more piezoelectric layers arranged in a bimorph configuration are used with an electrode on either side of each piezoelectric layer where one electrode receives a control voltage and the other electrode is a ground electrode. Piezoelectric bending actuators including bimorphs can provide rapid response with large deflections. Since piezoelectric actuators are driven by voltage and electric fields, the power requirements are small and capacitive in nature. Power is not required to maintain a position.

While the present invention is described with piezoelectric actuators, other actuators such as those described previously can be used within the scope of the invention.

Figure 2:
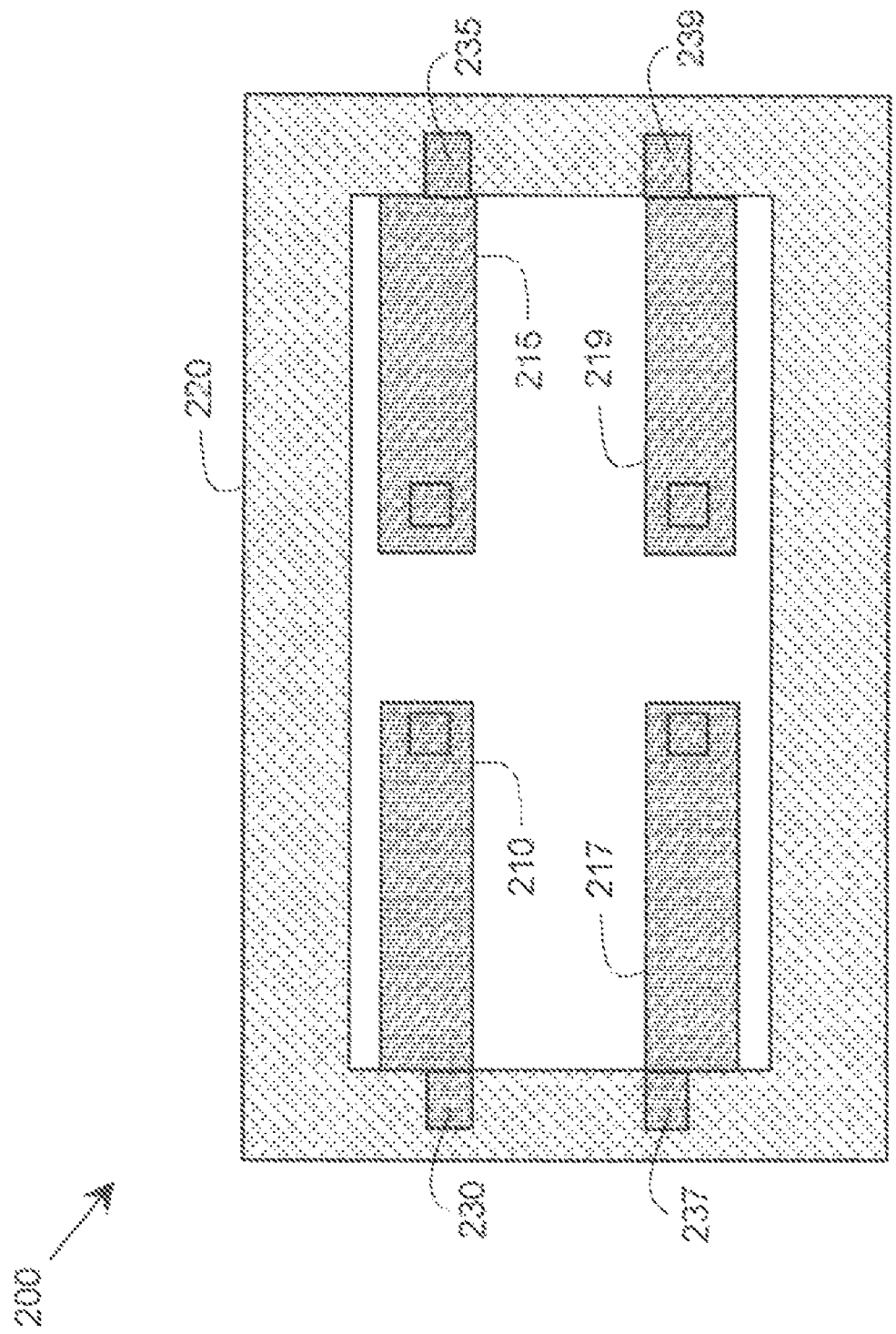
FIG. 2 is a schematic diagram of the frame and actuators in an embodiment of the present invention.
Figure 3:
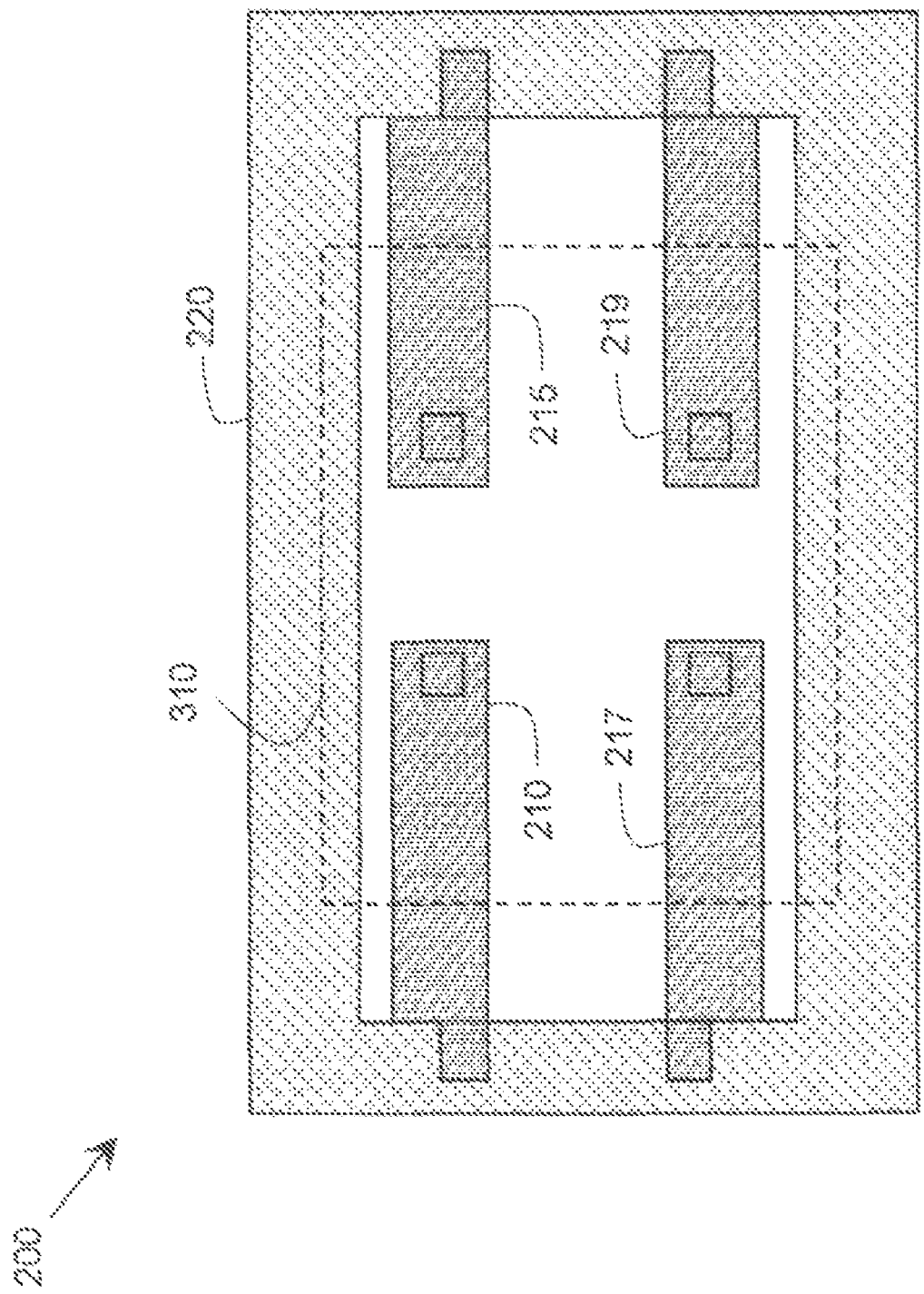
FIG. 3 is a schematic diagram of the frame and actuator showing the mirror location in the embodiment of the present invention shown in FIG. 2.

FIG. 2 shows a schematic diagram of a first embodiment of the invention. The moveable mirror assembly 200 includes four bending actuators 210, 215, 217 and 219 that are rigidly attached to a frame 220 on one end. Top electrical pads 230, 235, 237 and 239, accompanied by bottom electrical pads that are not shown, connect to bending actuators 210, 215, 217 and 219 respectively. As shown in FIG. 3, the bending actuators 210, 215, 217 and 219 extend and span under a mirror 310 and are flexibly connected by flexible connection 450 (see FIG. 4) to the mirror 310 at their other ends. By extending the bending actuators 210, 215, 217 and 219 under the mirror 310, the length of the bending actuators 210, 215, 217 and 219 can be relatively large while the moveable mirror assembly 200 remains substantially the size of the mirror 310. It is important to provide a relatively large length to the bending actuators to provide relatively large angular movement to the mirror for the imaging system application.

Table 1 shows the angular movement required for a zoom imaging system with a substantially telephoto fixed focal length lens which captures adjacent fields of view as provided by the moveable mirror. In the example shown in Table 1, the 12 degree field of view of the lens with a 4 mm or less aperture requires approximately a 5 mm or less mirror when the mirror is positioned at a 45 degree angle to the optical axis of the lens. For other lenses with a wider field of view, a bigger aperture or if the mirror is spaced farther from the aperture, a 10 mm mirror or less can be used. Beyond 10 mm the forces required to move the mirror become too large or the time to move the mirror becomes too long for the moveable mirror assembly that is the subject of the invention.

Table 1 also shows the stability of the mirror that is needed during image capture to prevent motion blur induced by movement of the mirror. For the example shown, the acceptable blur is shown as three pixels wherein a pixel amounts to 0.0048 degrees of the lens field of view. To prevent the mirror movement from changing the field of view by more than three pixels, the mirror movement during capture must be less than 0.0072 degrees or 0.0012% of the 6 degree range of movement of the mirror of the example. Consequently, it is very important that the mirror be positioned without movement or vibration during image capture.

TABLE 1

Example mirror movement
Mirror movement for multiple image zoom

| | |
|---|---|
| Lens field of view (degrees) | 12 |
| Number of pixels across the FOV | 2500 |
| Acceptable blur (pixels) | 3 |
| Full tilt of mirror (degrees) | 6 |
| Pixel width (degrees) | 0.0048 |
| Acceptable blur (degrees) | 0.0144 |
| Stability of mirror during capture (degrees) | 0.0072 |
| Stability of mirror during capture (%) | 0.0012 |
| Mirror lateral dimension (mm) | 5 |
| Edge movement at full tilt (mm) | 0.261321 |
| Halfway in from edge movement at full tilt (mm) | 0.130661 |

Table 2 provides 2 examples of the performance of piezoelectric benders in bimorph configurations that provide deflections that approximately match the mirror edge movement required as shown in Table 1 and as such could be used within the scope of the present invention. It should be noted that bending actuators including piezoelectric bending actuators can be made in which multiple actuators are connected together to increase the force produced by the actuator, so that while FIGS. 4, 5, 8, 9, 12, 13 and 15 show single bimorph actuators with 2 layers of piezoelectric material each, it is within the scope of the present invention to use multiple actuators that are connected together to provide more force. A discussion of the bending of a PVDF piezoelectric bimorph can be found in the article "Micromachined Unimorphs and Bimorphs" by R. Farlow, W. Galbraith, S. Kelly, G. Hayward; IEEE Ultrasonics Symposium, Atlanta, Ga., 2001, vol 2, pp 913-916. Other piezoelectric properties as provided by Morgan Electro Ceramics can be found at the website: www.morganelectroceramics.com/piezomaterials/pzmat11.html.

As taken from the article by Farlow et al, the general relationship for free deflection δ of the end of a bimorph is given in Eq. 1, where L is the length of the bimorph, H is its total thickness, d31 is the in-plane (normal to the thickness direction) piezoelectric strain constant and V is the potential difference between the top and bottom electrodes. As can be seen in Eq. 1, the deflection of the piezoelectric bending actuator is very sensitive to the length and the thickness.

$$d = d_{31} V [3/2(L/H)^2]$$  Eq. 1

TABLE 2

Examples of piezoelectric bimorph performance

| PVDF Bimorph Bender | |
|---|---|
| D31 (m/V or C/N) | 2.50E-11 |
| Bender Length (mm) | 6 |
| Single Piezo layer thickness (micron) | 12 |
| Bondline thickness (micron) | 6 |
| Conductor thickness (micron) | 0 |
| Voltage | 165 |
| Dielectric strength (V/um) | 30 |
| Youngs Modulus (Gpa) | 2 |
| PVDF Bimorph Free deflection (mm) | 2.48E-01 |
| PZT401 Bimorph Bender | |
| D31 (m/V or C/N) | 1.22E-10 |
| Bender Length (mm) | 6 |
| Single piezo layer thickness (micron) | 30 |
| Bondline thickness (micron) | 6 |
| Conductor thickness (micron) | 0 |
| Voltage | 165 |
| Dielectric strength (V/um) | |
| Youngs Modulus (Gpa) | 10 |
| PZT401 Bimorph Free deflection (mm) | 2.50E-01 |

Figure 4:
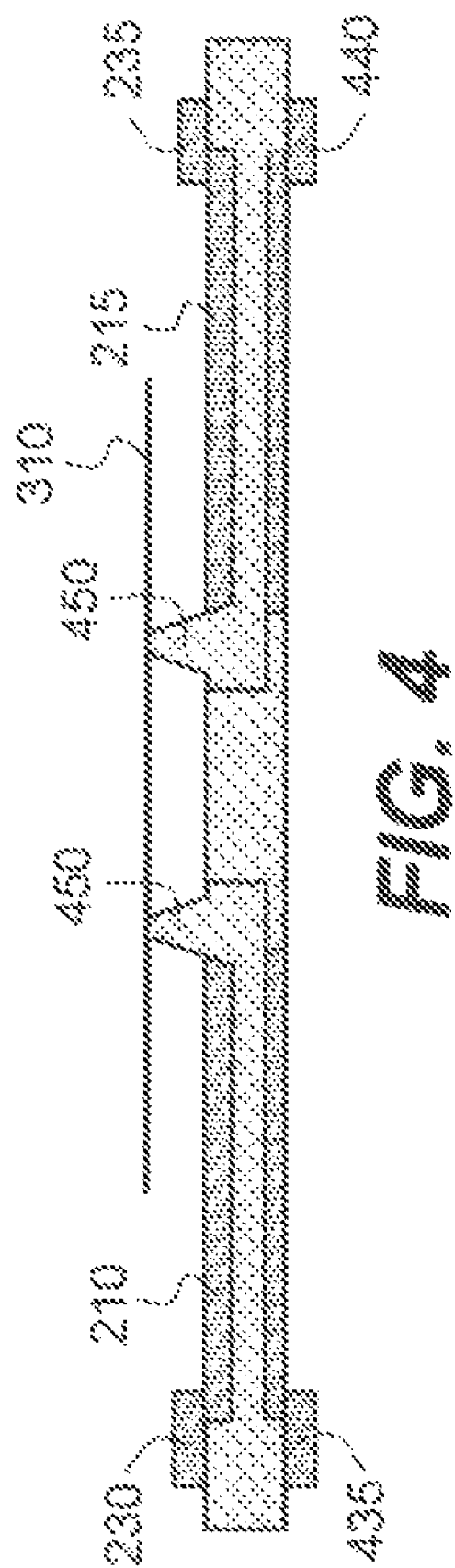
FIG. 4 is a schematic diagram of a cross section of the frame and actuators in the embodiment of the present invention shown in FIGS. 2 and 3 where no voltage has been applied to the electrical pads and the mirror is not tilted.

FIG. 4 shows a cross sectional view of the moveable mirror assembly 200 for the case where the mirror is in the untilted position when no voltage is applied to any of the top electrical pads 230 or 235 or the bottom electrical pads 435 or 440 which connect to top and bottom electrodes which extend over the length of the bending portion of the top and bottom piezoelectric layers. It is noted that only two mated pairs of electrical pads are shown but all electrical pads are mated likewise. Referring briefly to FIG. 12*a*, there is shown the actuator 210 (renumbered as 1010 due to FIG. 12*a* being an alternative embodiment); however, each actuator includes the same components. In this regard, the piezoelectric actuators are comprised of top and bottom piezoelectric layers 1065 and 1075 separated by a central layer 1070 which can be simply a ground electrode or can be ground electrodes on either side of a structural layer connected to the frame 220. Actuators 210 and 215 are shown with top and bottom electrical pads 230 and 435, 235 and 440. In operation, the voltages applied to the top and bottom electrical pads for each actuator are applied with opposite signs from one another for 230 and 435, or for 235 and 440 to obtain the maximum deflection from the piezoelectric actuators. The voltage applied to the top and bottom electrical pads 230 and 435, and 235 and 440 for other actuators 210, 215, 217 and 219 can be the same or opposite to bend the actuator in the same direction or opposite direction as needed to position the mirror 310 for the image desired. By combining positive and negative voltages to electrical pads 230 and 435, 235 and 440 for the actuators 210, 215, 217 and 219, the corners of the mirror 310 can be moved (raised and lowered) to produce an infinite number of tip and tilt positions of the mirror 310 within the range of movement of the actuators 210, 215, 217 and 219.

Figure 5:
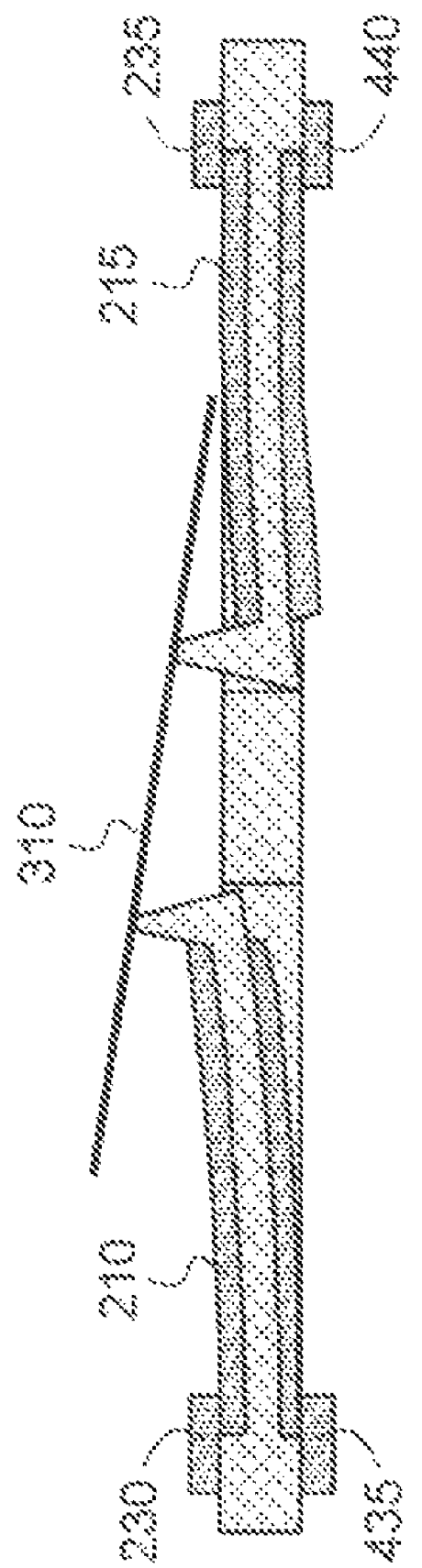
FIG. 5 is a schematic diagram of a cross section of the frame and actuators in the embodiment of the present invention shown in FIGS. 2-4 where voltage has been applied to the electrical pads and the mirror is tilted.

Also shown in FIG. 4 is an embodiment of a flexible connection 450 between the ends of the actuators 210 and 215 and the mirror 310. The flexible connections 450 shown in this embodiment are an extended tapered element with a small area of contact between the flexible connections 450 and the mirror 310. The small area of contact allows for flexing of the material at the area of contact with lower stress being applied to the mirror so that the mirror distortion is reduced as the mirror 310 is moved by the actuators 210 and 215. FIG. 5 shows the same embodiment as in FIG. 4 except with + and − voltage applied to the electrical pads 230 and 435 and the same − and + voltage applied to electrical pads 235 and 440 so that the actuators 210 and 215 bend in opposite directions and the mirror 310 tilts as for the case where a side image is captured in a zoom system.

Figure 6:
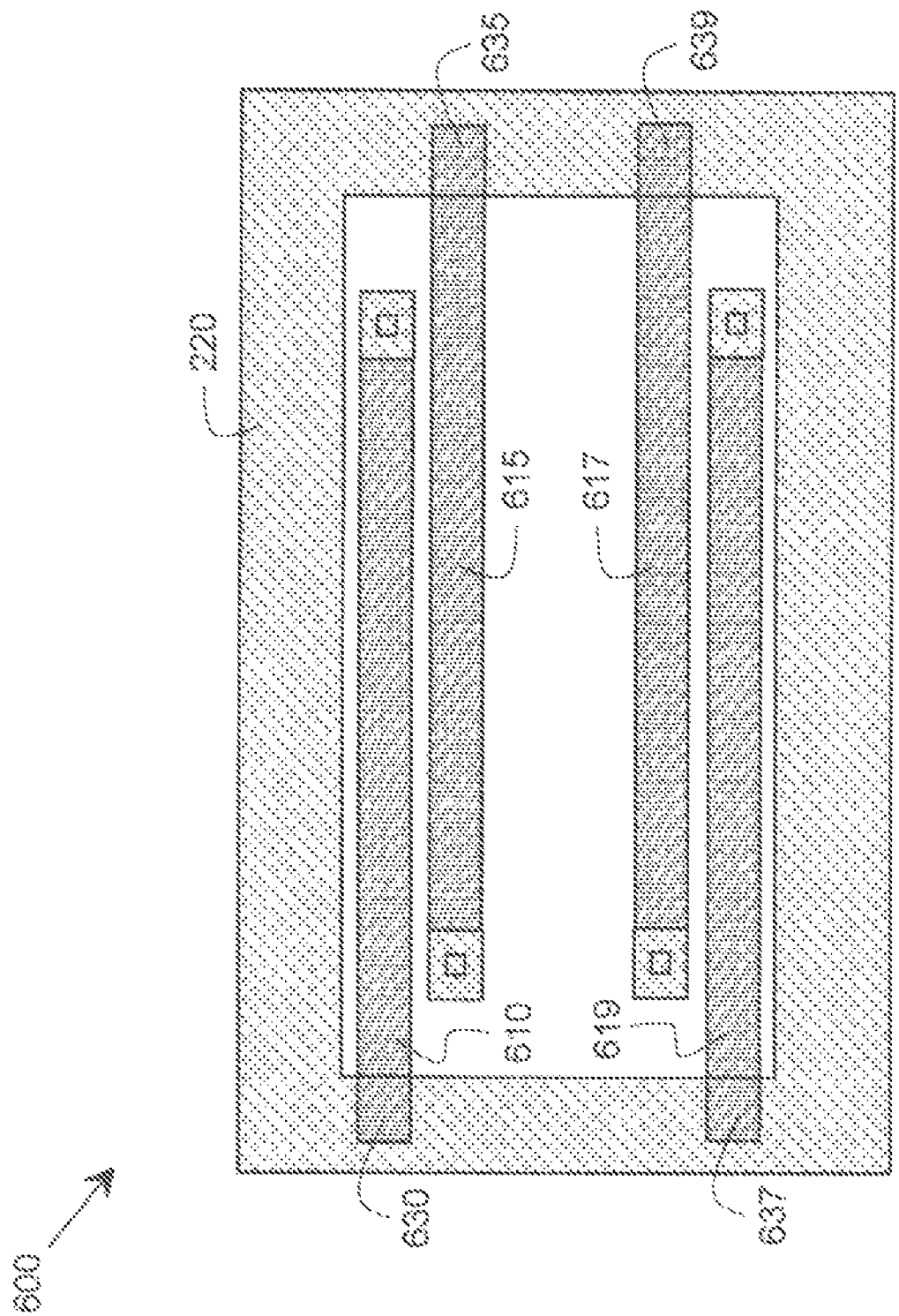
FIG. 6 is a schematic diagram of the frame and actuators in another embodiment of the present invention.
Figure 7:
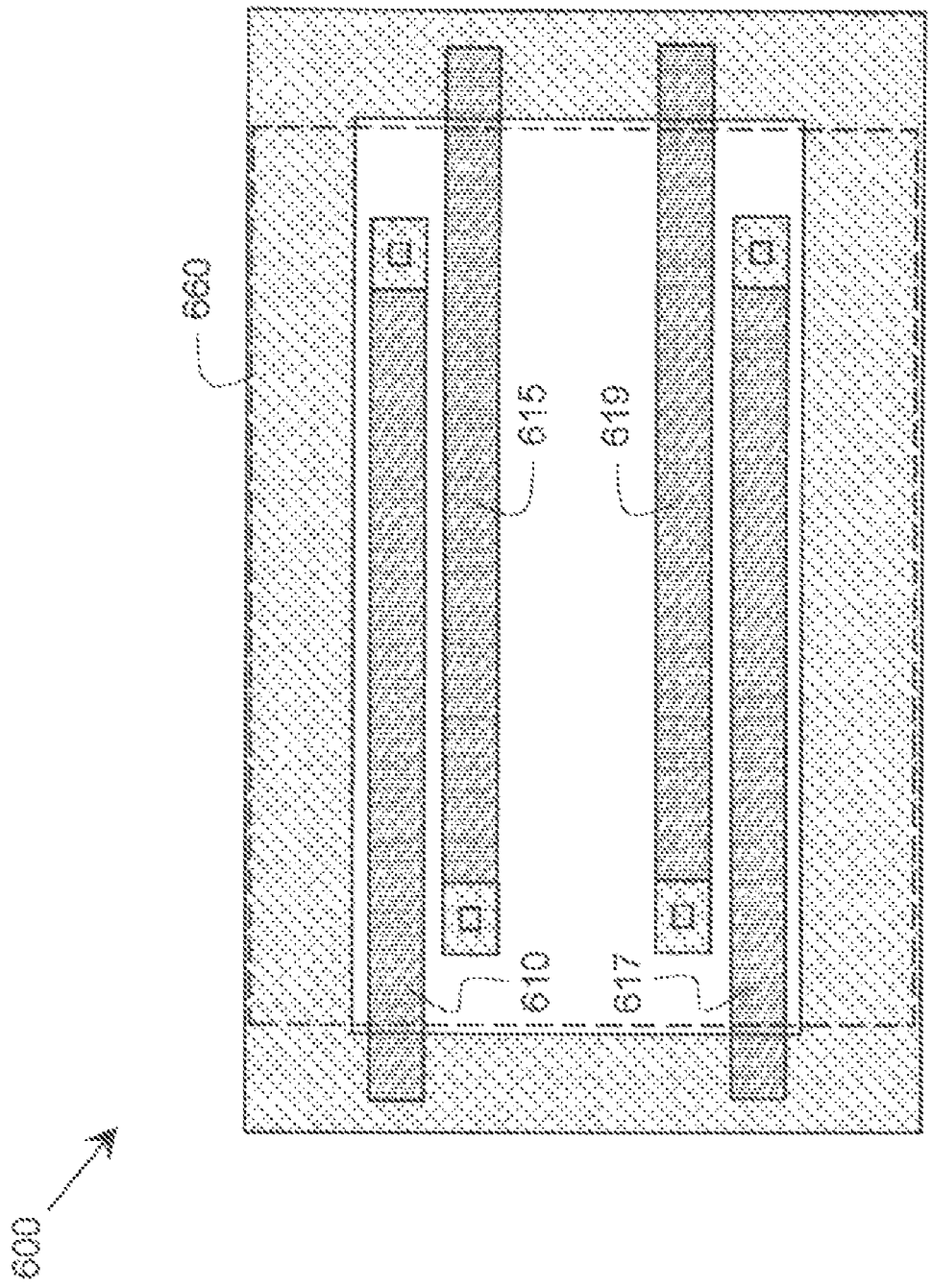
FIG. 7 is a schematic diagram of the frame and actuator showing the mirror location in the embodiment of the present invention shown in FIG. 6.
Figure 8:
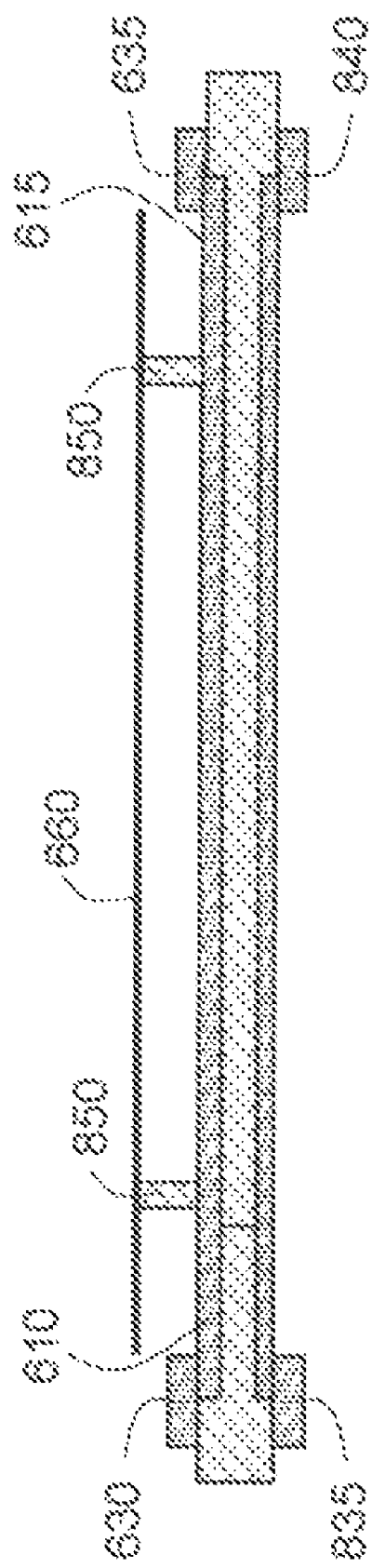
FIG. 8 is a schematic diagram of a cross section of the frame and actuators in the embodiment of the present invention shown in FIGS. 6 and 7 where no voltage has been applied to the electrical pads and mirror is not tilted.
Figure 9:
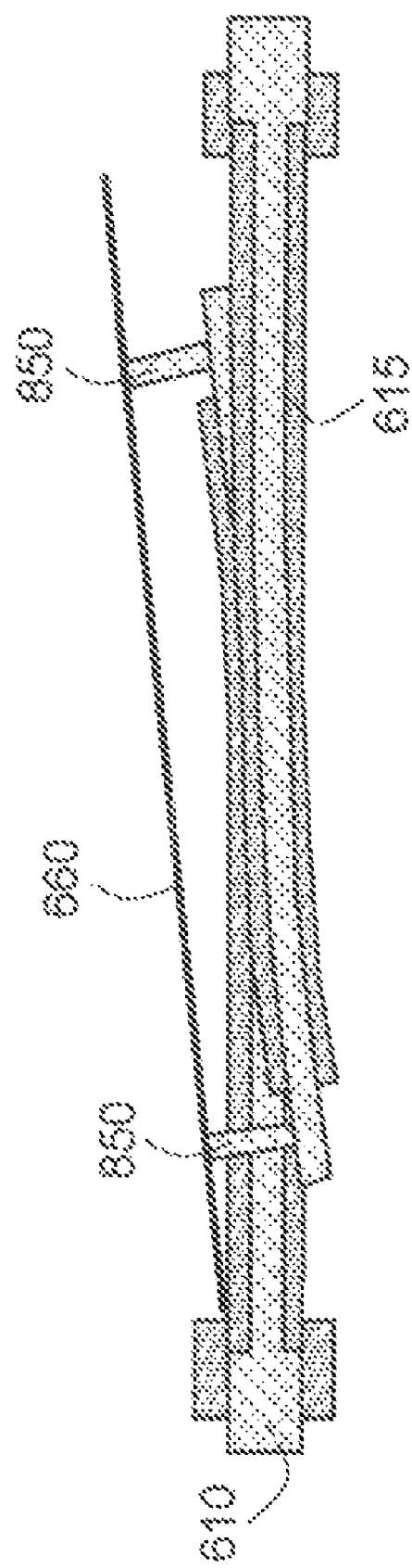
FIG. 9 is a schematic diagram of a cross section of the frame and actuators in the embodiment of the present invention shown in FIGS. 6-8 where a voltage has been applied to the electrical pads and the mirror is tilted.

FIG. 6 shows a schematic diagram of the moveable mirror assembly 600 in another embodiment of the present invention, in which the actuators are further extended spanning under the mirror to provide a longer length actuator so that the actuators are substantially totally hidden behind the mirror. The 4 actuators 610, 615, 617 and 619 are shown rigidly connected at one end to the frame 220. The actuators 610, 615, 617 and 619 extend underneath to the opposite side of the mirror 660 substantially spanning the entire width of the mirror as shown in FIGS. 7 and 8 where they are flexibly connected to the mirror 310. FIGS. 7-9 also show a relatively larger mirror wherein the actuators and the frame are substantially covered by the mirror thereby providing a very small moveable mirror assembly 600 relative to the size of the mirror 660. In this embodiment, the frame 220 is only slightly bigger than the mirror. For example, for a 5 mm mirror, the frame would be 6 mm or less in the lateral dimension or for a 10 mm mirror, the frame would be 12 mm or less in the lateral dimension.

FIG. 8 shows a cross sectional view of the moveable mirror assembly 600 for the case where no voltage is applied to the actuators and, as a result the mirror is not tilted and all the layers remain planar. A different type of structure 850 is shown to form a flexible connection between the actuator 615 and the mirror 310 wherein the structure has a lateral dimension that is much smaller than the length to insure that the structure is flexible. The ratio of the length of the structure to the lateral dimension of the structure is preferably greater than 4:1 to provide flexibility and less than 50:1 to avoid buckling of the structure 850 during operation. FIG. 9 shows a cross sectional view of the moveable mirror assembly 200 from FIGS. 6, 7 and 8 for the case where a voltage has been applied to the electrical pads 630, 635, 835 and 840 so that actuators 610 and 615 bend up and down respectively to tilt the mirror 310.

Figure 10:
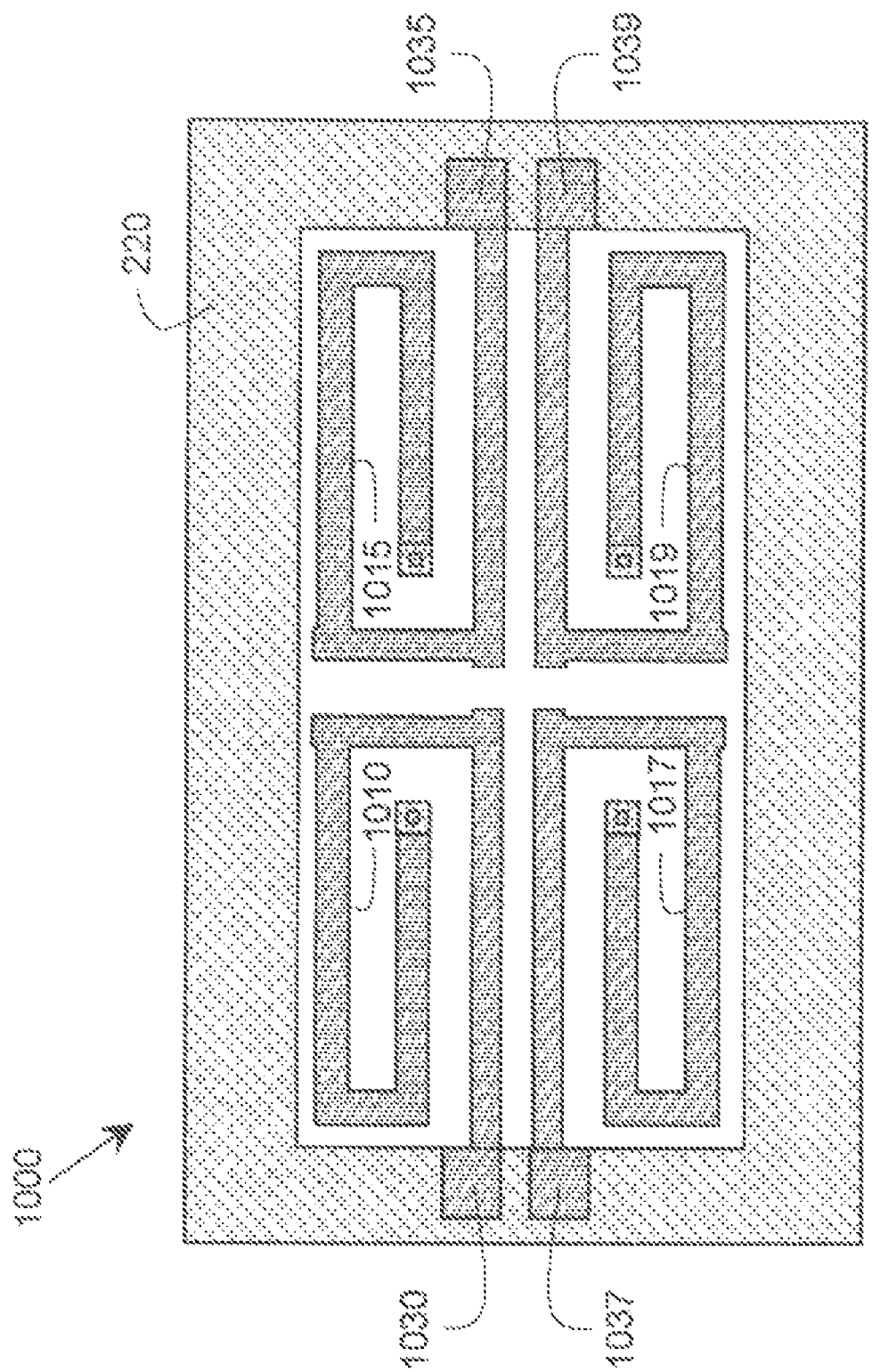
FIG. 10 is a schematic diagram of the frame and actuators in a further embodiment of the invention.
Figure 11:
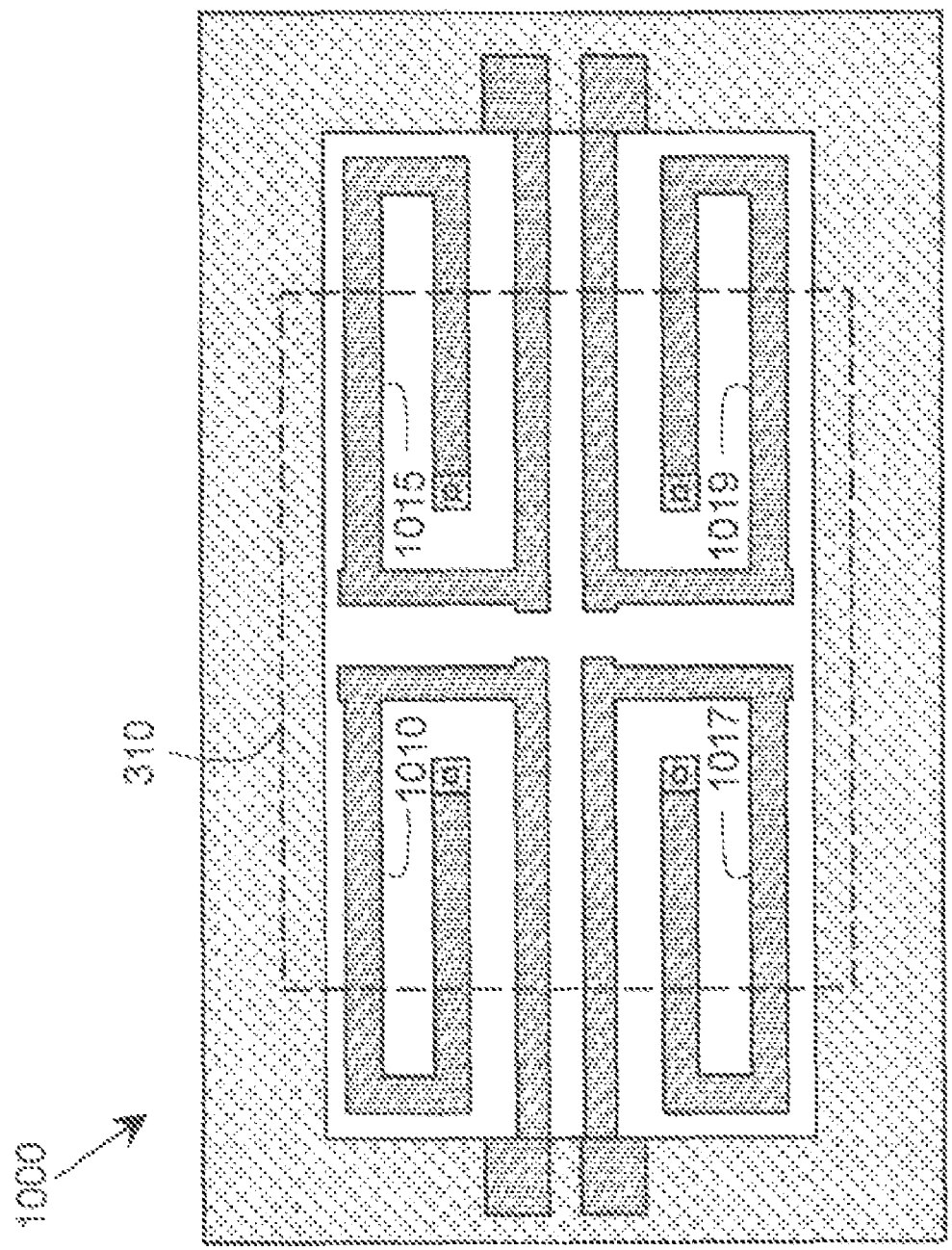
FIG. 11 is a schematic diagram of the frame and actuator showing the mirror location in the embodiment of the present invention shown in FIG. 10.

FIG. 10 shows a further embodiment of the invention of the moveable mirror assembly 1000 in which the actuators 1010, 1015, 1017 and 1019 are each arranged in a serpentine fashion under the mirror to enable the actuators to have a greater length to increase their deflection when a voltage is applied to their respective electrical pads. FIG. 11 shows the mirror 310 positioned over the actuators 1010, 1015, 1017 and 1019 of this embodiment of the moveable mirror assembly 1000. FIG. 12a shows one of the serpentine actuators 1010 for the case where no voltage has been applied to the electrical pads. FIG. 12b shows the actuator 1010 for the case where a voltage has been applied to the electrical pads so that the actuator 1010 bends upwards to raise the flexible connection structure 1050 and thereby cause the mirror 310 to tilt. As can be seen in FIG. 12b each portion of the serpentine actuator contributes to the deflection of the actuator 1010.

FIGS. 13a and 13b show the moveable mirror assembly 1300 in which the actuators are arranged as in FIGS. 6, 7 and 8. In this further embodiment, the mirror is formed from a thicker plate 1310 to reduce the deformation of the mirror when tilted by the actuators 610, 615, 617 and 619. In a preferred embodiment, the mirror plate 1310 is 2 times or more as thick as the lateral dimension of the flexible connection structure 650.

Figure 14:
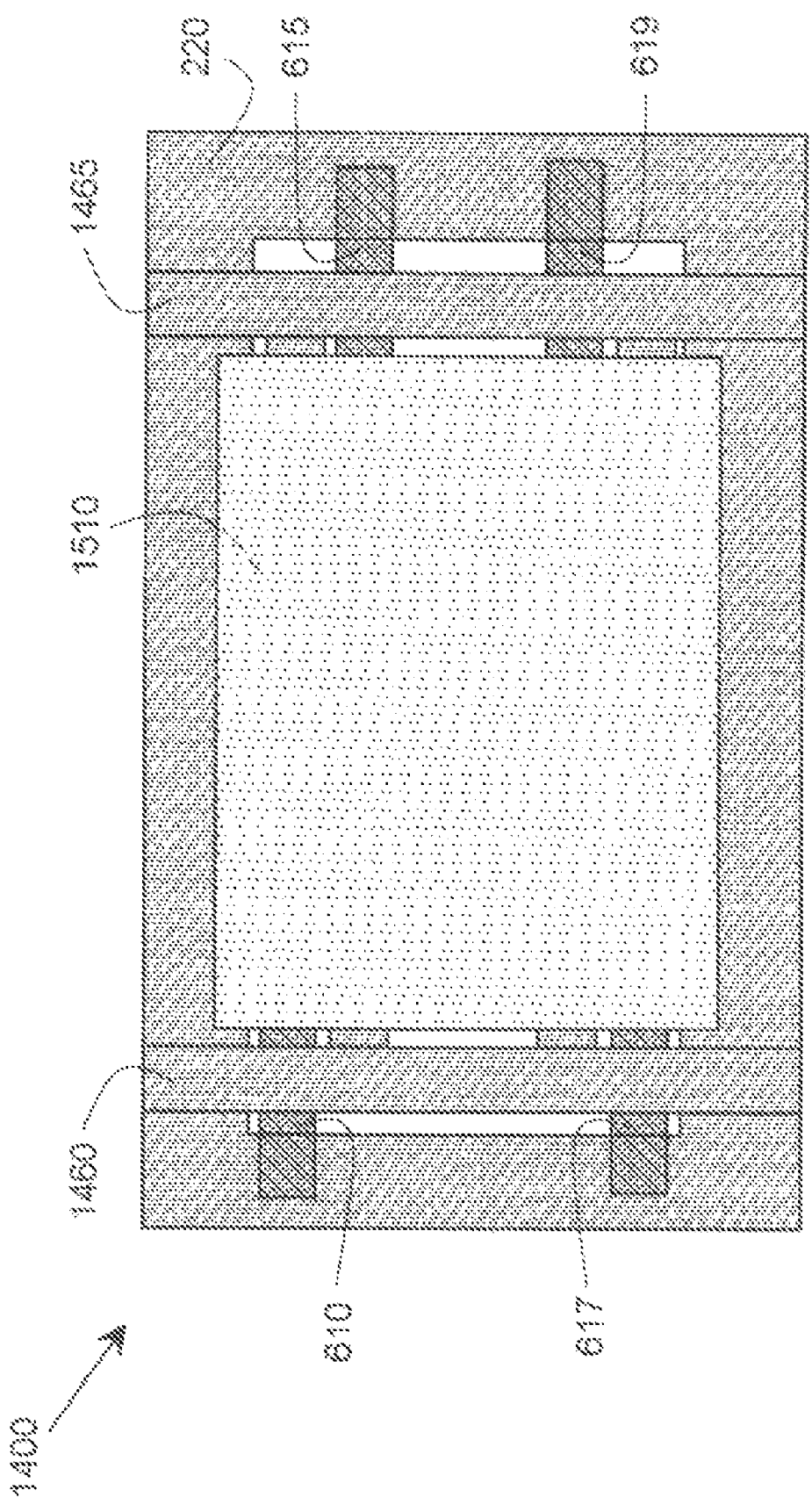
FIG. 14 is a schematic diagram of still another embodiment of the present invention where the moveable mirror assembly includes hard stops.

FIG. 14 shows yet another embodiment of the moveable mirror assembly 1400 which is the subject of the invention where hard stops 1460 and 1465 are attached to the frame 220. In FIG. 15a the hard stops 1460, 1465, 1467 and 1469 are shown in a cross sectional view relative to the actuators 610 and 615 for the case where no voltage has been applied to the electrical pads and the mirror 1510 is flat. Wherein, the mirror 1510 is shown as a structure which includes ribs to reduce the deformation of the mirror while reducing the weight of the mirror for lower inertia. FIG. 15b shows the moveable mirror assembly in another cross sectional view for the case where voltage has been applied to the electrical pads causing the actuators 610 and 615 to bend such that the ends of the actuators that are distal to the end that connects to the frame 220, contact the hard stops 1465 and 1467 as shown. As shown in FIG. 15b, when the actuators 610 and 615 contact the hard stops 1465 and 1467 respectively, the positions of the ends of the actuators are precisely located and vibration is reduced so that rapid repositioning processes can be performed. By using the 4 actuators 610, 615, 617 and 619 with combinations of positive and negative voltages to the actuators contacting the hard stops 1460 and 1465, 8 positions of the tilted mirror can be provided along with the central position where no voltage is applied to the electrical pads. Table 3 shows the mirror positions for different fields of view as seen by the lens provided by the different combinations of the 4 actuators when the actuators are operated in an up/down fashion to the contact point with the hard stops. All of the 9 positions can be achieved with increased repeatability and increased accuracy with the hard stops. By using hard stops, precise positioning of the mirror can be accomplished without the need for position measurement or feedback control thereby further thereby avoiding additional costs in the moveable mirror assembly. In addition, the moveable mirror assembly 1400 is substantially planar so that it is well suited for manufacturing with MEMs processes to reduce the cost of the device. This applies to each embodiment 200, 600 and 1000.

Table 3 Mirror positions for different fields of view produced by operation of the 4 actuators to the contact point with the hard stops.

Mirror position numbers for different fields of view

| 1 Top left | 2 Top center | 3 Top right |
|---|---|---|
| 4 Left center | 5 Center | 6 Right center |
| 7 Bottom left | 8 Bottom center | 9 Bottom right |

Actuator positions to produce the mirror position

| Mirror position number | Actuator 610 | Actuator 615 | Actuator 617 | Actuator 619 |
|---|---|---|---|---|
| 1 | Down | Neutral | Up | Neutral |
| 2 | Down | Down | Up | Up |
| 3 | Neutral | Down | Neutral | Up |
| 4 | Down | Up | Up | Down |
| 5 | Neutral | Neutral | Neutral | Neutral |
| 6 | Up | Down | Down | Up |
| 7 | Neutral | Up | Neutral | Down |
| 8 | Up | Up | Down | Down |
| 9 | Up | Neutral | Down | Neutral |

It should be noted that it is within the scope of the invention for the mirror to be flexibly attached to the actuators through a flexible continuous structure or alternately through a small blob of adhesive. In addition, the mirror can be mounted to a frame to further reduce deformations of the mirror surface during bending of the actuators.

The invention has been described in detail with particular reference to certain preferred embodiments thereof, but it will be understood that variations and modifications can be effected within the spirit and scope of the invention.

PARTS LIST

105 Image module assembly
110 Lens assembly
120 Moveable mirror assembly
130 Image sensor
140 Incoming light from the scene
150 Cover glass
200 Moveable mirror assembly
210 Actuator
215 Actuator
217 Actuator
219 Actuator
220 Frame
230 Top electrical pad
235 Top electrical pad
237 Top electrical pad
239 Top electrical pad
310 Mirror
435 Bottom electrical pad
440 Bottom electrical pad
450 Flexible connection structure
600 Moveable mirror assembly
610 Actuator
615 Actuator
617 Actuator
619 Actuator
630 Top electrical pad
635 Top electrical pad
637 Top electrical pad
639 Top electrical pad
650 flexible connection
660 mirror
835 Bottom electrical pad
840 Bottom electrical pad
850 Flexible connection structure
1000 Moveable mirror assembly
1010 Actuator
1015 Actuator
1017 Actuator
1019 Actuator
1030 Top electrical pad
1035 Top electrical pad
1037 Top electrical pad
1039 Top electrical pad
1050 Flexible connection structure
1300 Moveable mirror assembly
1310 Thick plate mirror
1400 Moveable mirror assembly
1460 Top hard stop
1465 Top hard stop
1467 Bottom hard stop
1469 Bottom hard stop
1510 Mirror with ribs

The invention claimed is:

1. An apparatus for tipping or tilting a mirror, the apparatus comprising:
    (a) four independently operable bending actuators each placed substantially parallel to each other and each operable in two different directions; and
    (b) a mirror flexibly connected to the four bending actuators so that the mirror is tipped or tilted by the four bending actuators which tipping or tilting results from two or more of the actuators bending in opposite directions about an un-tilted position to a series of known positions for providing a range of angular movement.

2. The apparatus as in claim 1 further comprising one or more stops disposed adjacent each bending actuator so that the stops restrict the movement of the mirror beyond predetermined points in order to obtain a series of known positions that provide a range of angular movement about the un-tilted position.

3. The apparatus as in claim 1, wherein the actuators and mirrors are comprised of substantial planar structures.

4. The apparatus as in claim 1, wherein each bending actuator is serpentine shaped.

5. The apparatus as in claim 1, wherein the four bending actuators are flexibly connected to the mirror at peripheral portions of the mirror.

6. The apparatus as in claim 1 further comprising a frame and the four bending actuators are rigidly connected to the frame on one end and are flexibly connected to the mirror at the distal end of the bending actuator.

7. The apparatus as in claim 1 further comprising a structure extending from each actuator to the mirror and includes a ratio of length over diameter greater than 4 and less than 50 for flexibly connecting the actuator to the mirror.

8. The apparatus as in claim 1, wherein the mirror is 5 mm or less in its shortest direction of its area.

9. The apparatus as in claim 6, wherein the frame is 6 mm or less in its shortest direction of its area.

10. The apparatus as in claim 1, wherein the mirror is 10 mm or less in its shortest direction of its area.

11. The apparatus as in claim 6, wherein the frame is 12 mm or less in its shortest direction of its area.

12. The apparatus as in claim 1, wherein the four actuators only span the mirror.

13. The apparatus as in claim 2, wherein the stops provides 8 positions for the mirror.

14. The apparatus as in claim 1, wherein the actuator is a piezoelectric actuator.

* * * * *